(12) United States Patent
Bin

(10) Patent No.: US 7,646,121 B2
(45) Date of Patent: Jan. 12, 2010

(54) BOBBIN-LESS STEPPING MOTOR AND ELECTRONIC APPARATUS

(75) Inventor: Zhou Rong Bin, Dong-Guan shi (CN)

(73) Assignees: Seiko Instruments Inc., Chiba-shi (JP); Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/538,605

(22) Filed: Oct. 4, 2006

(65) Prior Publication Data

US 2007/0222329 A1     Sep. 27, 2007

(30) Foreign Application Priority Data

Oct. 9, 2005    (CN) .................... 2005 1 0108180

(51) Int. Cl.
*H02K 37/14* (2006.01)
*H02K 5/22* (2006.01)

(52) U.S. Cl. .................. 310/71; 310/49 A; 310/257; 310/49 R

(58) Field of Classification Search ............... 310/257, 310/71, 49 R
See application file for complete search history.

(56) References Cited

U.S. PATENT DOCUMENTS

| | | | | |
|---|---|---|---|---|
| 4,140,934 | A * | 2/1979 | Jager et al. | 310/71 |
| 4,853,568 | A * | 8/1989 | Fujiwara | 310/68 C |
| 5,121,017 | A * | 6/1992 | Yamamoto et al. | 310/49 R |
| 5,912,517 | A * | 6/1999 | Nishimura et al. | 310/71 |
| 6,744,156 | B2 * | 6/2004 | Doi | 310/49 R |
| 6,765,320 | B1 * | 7/2004 | Suzuki et al. | 310/49 R |
| 6,829,011 | B1 * | 12/2004 | Higuchi et al. | 348/340 |
| 7,071,593 | B2 * | 7/2006 | Matsushita et al. | 310/257 |
| 2003/0057799 | A1 * | 3/2003 | Ohiwa et al. | 310/257 |

(Continued)

FOREIGN PATENT DOCUMENTS

JP        62037051        2/1987

(Continued)

OTHER PUBLICATIONS

Manual Translation of JP 03-135356, "Terminal Structure FOF a Small Motor", Fujimoto etal. Jun. 10, 1991.*

(Continued)

*Primary Examiner*—Karl I Tamai
(74) *Attorney, Agent, or Firm*—Grossman, Tucker, Perreault & Pfleger, PLLC

(57) ABSTRACT

A stepping motor includes a rotor including a cylindrical permanent magnet, ring-shaped first and second yoke units that are arranged so as to be mutually stacked along an axis of the rotor, electrical connection members of resin material that include external connection terminals and are respectively secured to the first and second yoke units, and a pair of lid members. Each of the first and second yoke units includes a ring-shaped air-core coil, an outer yoke that accommodates therein the air-core coil and includes magnetic pole teeth arranged at fixed intervals in a circumferential direction of the air-core coil, and an inner yoke that includes a plurality of magnetic pole teeth arranged at fixed intervals in a circumferential direction of the air-core coil, and is combined with the outer yoke. Winding ends of the air-core coil are electrically connected to the external connection terminals.

6 Claims, 6 Drawing Sheets

U.S. PATENT DOCUMENTS

| | | | |
|---|---|---|---|
| 2004/0010908 A1 | 1/2004 | Kobayashi | |
| 2004/0021375 A1* | 2/2004 | Mayumi | 310/49 R |
| 2007/0222329 A1* | 9/2007 | Bin | 310/257 |

FOREIGN PATENT DOCUMENTS

| | | | |
|---|---|---|---|
| JP | 62-092738 | * | 4/1987 |
| JP | 63-059746 | * | 3/1988 |
| JP | 02072670 | | 6/1990 |
| JP | H03-112356 | | 3/1991 |
| JP | 03-135356 | * | 6/1991 |
| JP | 04042767 | | 2/1992 |
| JP | 05060174 | | 8/1993 |
| JP | 2001-078419 | | 3/2001 |
| JP | 2004-032847 | * | 1/2004 |
| JP | 2004032830 | | 1/2004 |
| JP | 2004-289961 | | 10/2004 |
| JP | 2007-110884 | * | 4/2007 |

OTHER PUBLICATIONS

Japanese Office Action dated Oct. 21, 2008 issued in related Japanese Patent Application No. 5005-377719.

* cited by examiner

BOBBIN-LESS STEPPING MOTOR AND ELECTRONIC APPARATUS

BACKGROUND OF THE INVENTION

1. Field of the Invention

The present invention relates to a stepping motor used as a drive source for a lens drive and the like such as focus and zoom in a digital camera, a camera-fitted mobile telephone, and the like, and an electronic apparatus that includes the stepping motor.

Priority is claimed on Chinese Patent Application No. 200510108180.6, filed Oct. 9, 2005, the content of which is incorporated herein by reference.

2. Description of Related Art

Stepping motors have excellent compatibility with digital control systems, and are recently being frequently used as drive sources for a lens drive and the like such as focus and zoom in electronic apparatuses such as digital cameras and camera-fitted mobile telephones. Use of crow-pole type stepping motors is particularly frequent, since their manufacturing cost can easily be reduced and they are simple to control.

Various types of crow-pole stepping motor have been provided, such as, for example, a two-phase PM type stepping motor that includes two stators (A-phase stator and B-phase stator) incorporated in a cup-shaped housing (e.g., Japanese Unexamined Patent Application, First Publications Nos. 2004-289961 and 2001-78419) and a two-phase PM type stepping motor that does not use a housing (e.g., Japanese Unexamined Patent Application, First Publication No. H03-112356).

As shown in FIGS. 6 and 7, for example, a two-phase PM type stepping motor 30 using a housing includes a rotor 32 consisting of a cylindrical permanent magnet 31 that is multipole magnetized in a circumferential direction R, an A-phase stator 33 and a B-phase stator 34 that are arranged so as to be mutually stacked along an axis L when disposed around the perimeter of the rotor 32, a housing 35 which the A-phase stator 33 and the B-phase stator 34 are accommodated inside of, and a bracket 36 that rotatably supports the rotor 32 after sealing the housing 35 with a lid.

The A-phase stator 33 and the B-phase stator 34 have identical configurations, including an exciting coil 42 formed by winding a coil winding 41 around the outer periphery of a ring-shaped bobbin 40 of resin material, and a pair of yokes 43 that enclose the exciting coil 42 from both sides along the direction of the axis L. A plurality of pole teeth 44 are formed in each of the pair of yokes 43, which enclose the bobbin 40 from both sides while being guided by a guide groove 40a formed in an inner peripheral face of the bobbin 40. At this time, the pole teeth 44 of the pair of yokes 43 are combined with the bobbin with their pitches deviate so that they sequentially arranged in a noncontacting state in the circumferential direction R.

An inner peripheral face of the housing 35 contacts the outer periphery of the pair of yokes 43. Ends of the coil winding 41 wound around the exciting coil 42 are connected to external connectors 40b of the bobbin 40, enabling them to be electrically connected to an external component (not shown), such as a circuit component. Incidentally, the external connectors 40b of the bobbin 40 are exposed to the outside via a notch (not shown) formed in the housing 35.

The conventional crow-pole type stepping motor 30 using the housing 35 in this manner forms the exciting coil 42 by winding the coil winding 41 around the ring-shaped bobbin 40, and can also be electrically connected to the outside by using the bobbin 40.

In contrast, a two-phase PM type stepping motor that does not use a housing includes one yoke unit having an inner yoke and a cup-shaped outer yoke; these yokes are arranged so as to surround the periphery of an exciting coil.

As regards the formation of an exciting coil by winding a coil winding around the outer periphery of a bobbin, this stepping motor is the same as the stepping motor using the housing described above.

However, in the conventional stepping motors described in Japanese Unexamined Patent Application, First Publications Nos. 2004-289961 and 2001-78418 mentioned above, the following problems remain.

Since the exciting coil 42 is formed by winding the coil winding 41 around the bobbin 40 of resin material, the space occupied by the bobbin 40 inside the cross-sectional accommodation space of the exciting coil 42 enclosed by the yokes 43 is magnetically wasteful.

The space occupied by the bobbin 40 is particularly problematic in a small-sized stepping motor whose external diameter is ø6 mm or less, and makes it difficult to secure a large coil volume. This leads to deterioration in the torque characteristic.

SUMMARY OF THE INVENTION

The present invention has been made in view of the above circumstances. It is an object of the invention to provide a stepping motor that can achieve a larger coil volume without changing the overall size, and can improve the torque characteristic by maximized the magnetomotive force generated by the coil. Another object is to provide an electronic apparatus that includes the stepping motor.

The invention uses the following means to achieve these objects.

A stepping motor of the invention includes a rotor including a cylindrical permanent magnet that is multipole magnetized in a circumferential direction R, ring-shaped first and second yoke units that are arranged so as to be mutually stacked along an axis of the rotor while surrounding a periphery of the rotor, electrical connection members of resin material that include external connection terminals and are respectively secured to the first and second yoke units; and a pair of lid members that enclose the first and second yoke units from both sides thereof along the axis, and support the rotor so as to be rotatable around the axis. Each of the first and second yoke units includes a ring-shaped air-core coil having an insulated surface, an outer yoke that accommodates therein the air-core coil and includes a plurality of magnetic pole teeth arranged at fixed intervals in a circumferential direction of the air-core coil, and an inner yoke that includes a plurality of magnetic pole teeth arranged at fixed intervals in a circumferential direction of the air-core coil, and is combined with the outer yoke such that the magnetic pole teeth are arranged alternately and at equal intervals in a noncontacting state with respect to the magnetic pole teeth of the outer yoke. Winding ends of the air-core coil are electrically connected to the external connection terminals.

The stepping motor according to the invention is a crow-pole two-phase PM type stepping motor constituted by the rotor that includes the permanent magnet, the first yoke that forms an A-phase stator, the second yoke that forms a B-phase stator, and the pair of lid members that enclose the yoke units from both sides thereof along the axis and support the rotor so as to be rotatable around the axis.

In particular, the first and second yoke units differ from those using a conventional excitation coil wherein a coil winding is wound around the outer periphery of a bobbin, in that the air-core coil formed in a ring shape beforehand is used as an excitation coil, enabling the space conventionally occupied by a bobbin to be allocated for the air-core coil. This enables the coil volume to be increased without changing the overall size. As a result, the magnetomotive force of the coil can be greatly increased and the torque characteristic can be improved.

Furthermore, since the winding ends of the air-core coil are connected to the external connection terminals of the coil lead terminal that are respectively secured to the first and second yoke units, they can be electrically connected to external components such as circuit components reliably and easily without a bobbin. Therefore, the air-core coil can be used in the same manner as a conventional coil without requiring special connection means.

Instead of using a housing, the configuration combines the outer yokes, the inner yokes, and the air-core coils, making it easy to assemble. That is, instead of assembling an A-phase stator and a B-phase stator separately and then incorporating them in a housing, the constituent components can be assembled sequentially by a series of processes such as, for example, securing back faces of the outer yokes of the first and second yoke units opposite each other, accommodating the air-core coil in an internal space of the outer yoke, and covering the outer yoke with the inner yoke. This makes assembly easier and more precise. Since no housing is required, the configuration can also be made smaller.

In the stepping motor of the invention, the outer yoke, the air-core coil, and the inner yoke can be secured together by an insulating material.

In the stepping motor of the invention, since the outer yoke, the air-core coil, and the inner yoke are secured together using a liquid insulating substance such as varnish, the first and second yoke units can be assembled sturdily. This strengthens the structure and increases the reliability of the quality.

In the stepping motor of the invention, the electrical connection members can include nonmagnetic metal members provided in regions that contact at least the first and second yoke units.

In the stepping motor of the invention, since nonmagnetic metal material such as stainless steel and aluminum is provided in regions where the electrical connection members contact at least the first and second yoke units, the electrical connection members can be secured to the first and second yoke units by welding. This strengthens the entire structure when assembled, and increases the reliability of the quality.

The stepping motor of the invention further includes a yoke positioning means that positions the inner yoke and the outer yoke when they are combined.

Since the stepping motor of the invention includes the yoke positioning means, the inner yoke and the outer yoke can be combined with magnetic pole teeth of the outer yoke and magnetic pole teeth of the inner yoke reliably arranged, alternately and at equal intervals, facing the circumferential direction R in a noncontacting state. This increases the precision of the assembly. Therefore, unwanted magnetic leakage can be reduced and the torque characteristic can be enhanced.

The stepping motor of the invention further includes a connection member positioning means that positions the electrical connection members with respect to the first and second yoke units.

Since the stepping motor of the invention includes the connection member positioning means, the electrical connection members can be positioned with respect to the first and second yoke units, and the winding ends of the air-core coils can be reliably connected to the external connection terminals. This increases the assembly precision and further improves the quality.

An electronic apparatus of the invention includes the stepping motor of the invention.

Since the electronic apparatus of the invention includes the stepping motor whose torque characteristic is enhanced without changing its size in comparison with a conventional stepping motor, the driving force of the stepping motor having the improved torque characteristic can be utilized as a driving source for various mechanisms, without changing the size of the electronic apparatus itself.

The electronic apparatus of the invention can include a camera module that includes a lens body arranged such that it can move along an optical axis, a lens driving means that moves the lens body along the optical axis in conjunction with the rotation of the rotor, and an imaging element arranged on the optical axis.

In the electronic apparatus of the invention, when the rotor is rotated, the lens driving means moves the lens body freely along the optical axis. This enables the distance between the imaging element arranged on the optical axis and the lens body to be adjusted as desired. Therefore, an image can be taken while performing an operation such as zooming and focusing. Since the stepping motor having an enhanced torque characteristic is used as the driving source for the camera module, operations such as zooming and focusing can be performed easily and smoothly.

According to the stepping motor of the invention, a larger coil volume can be achieved without changing the overall size, and the torque characteristic can be enhanced by maximizing the magnetomotive force generated by the coil.

According to the electronic apparatus of the invention, the driving force of the stepping motor having an enhanced torque characteristic can be utilized as a driving source for various mechanisms, without changing the size of the electronic apparatus itself, thereby improving performance and reliability.

DETAILED DESCRIPTION OF THE INVENTION

Embodiments of a stepping motor and an electronic apparatus according to the invention will be explained with reference to FIGS. 1 to 5.

Figure 1:
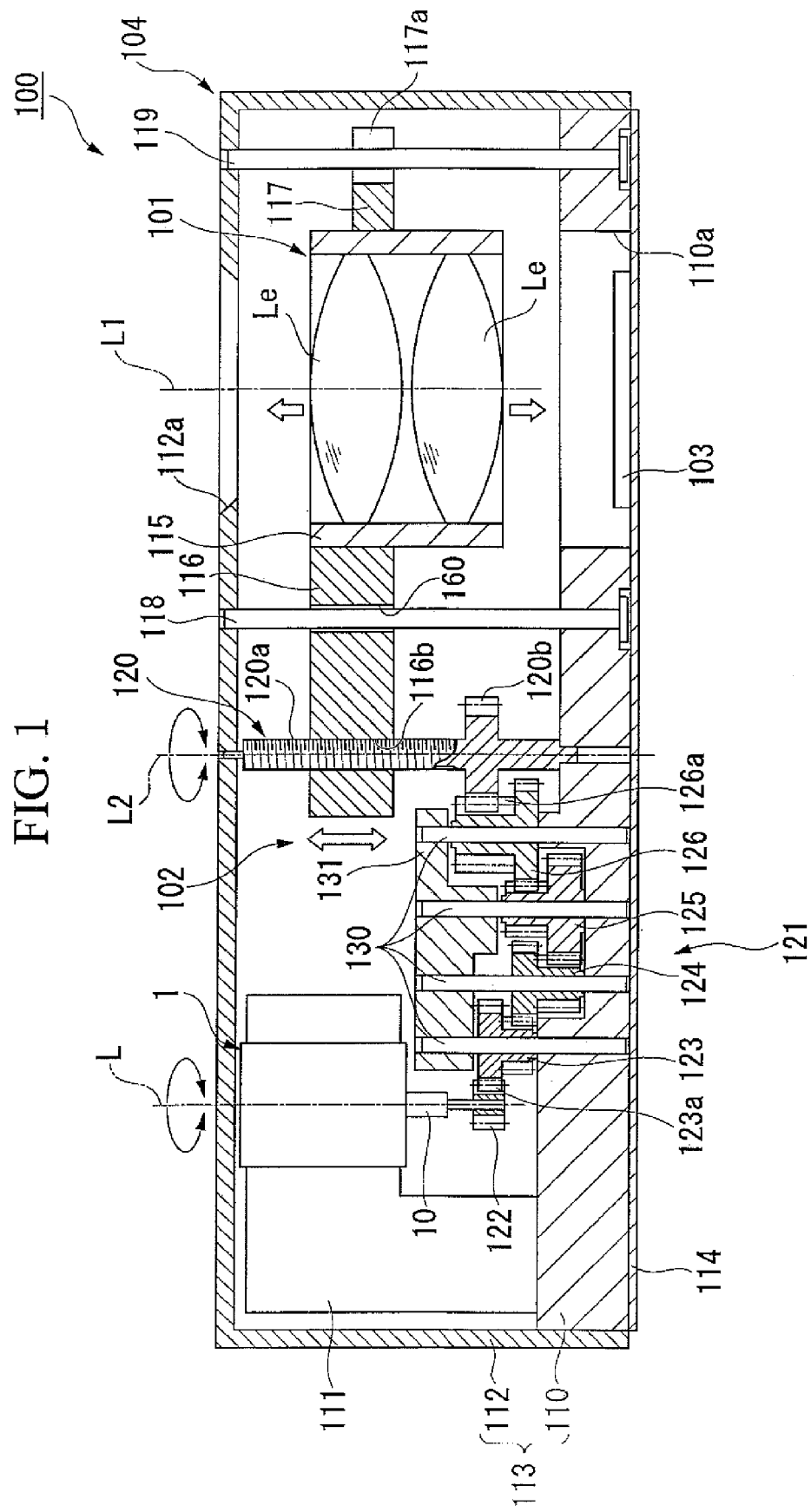
FIG. 1 is a cross-sectional view of an embodiment of an electronic apparatus including a stepping motor according to the invention.

As shown in FIG. 1, a camera-fitted mobile telephone (electronic apparatus) 100 of this embodiment includes a stepping motor 1, a lens body 101 movably arranged along an optical axis L1, a lens driving unit 102 that moves the lens body 101 along the optical axis L1 in conjunction with the rotation of a rotor 3 (described below) of the stepping motor 1, and a camera module 104 that includes an imaging element 103 arranged on the optical axis L1.

Figure 2:
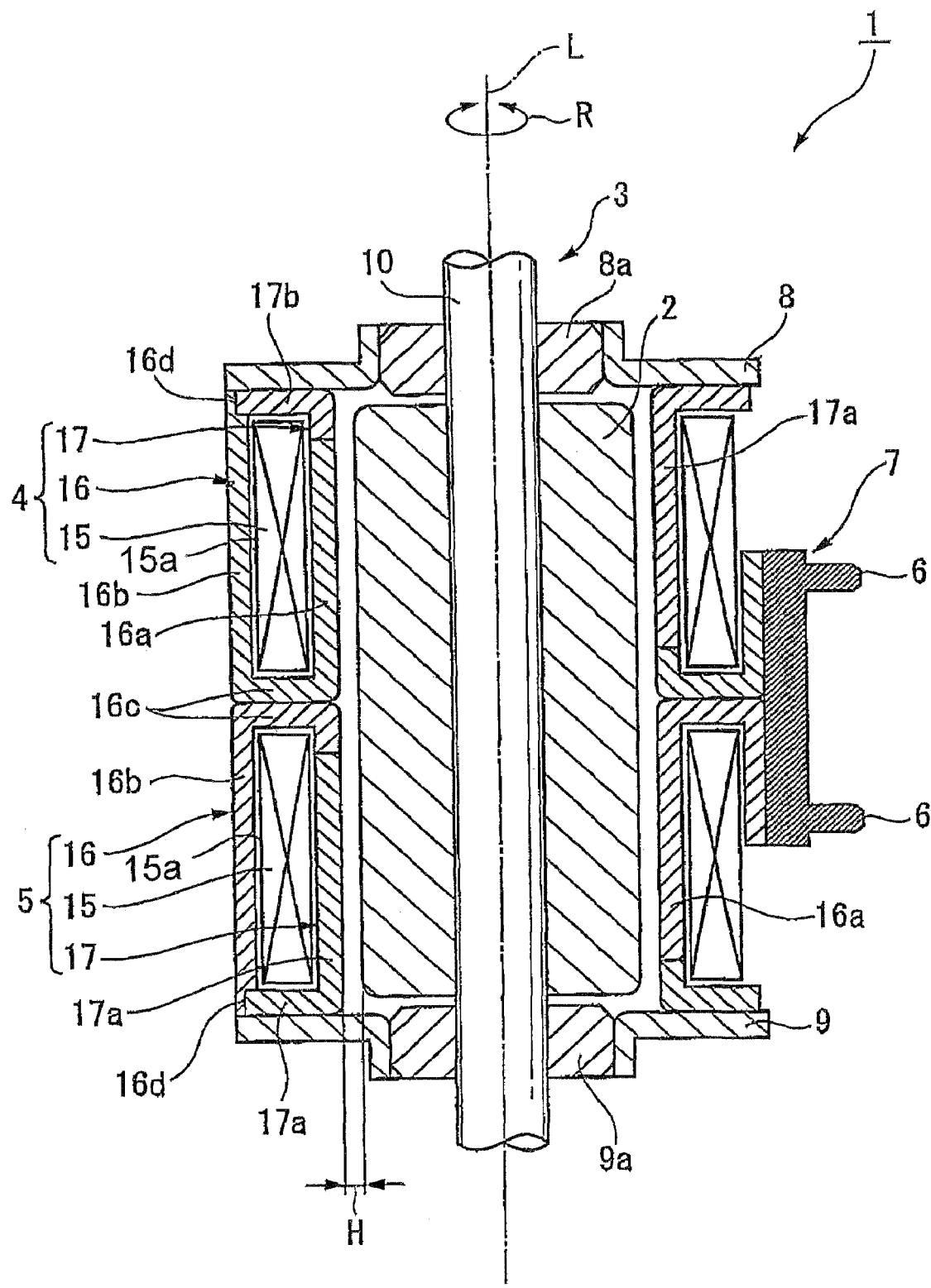
FIG. 2 is a cross-sectional view of an embodiment of the stepping motor shown in FIG. 1.
Figure 3:
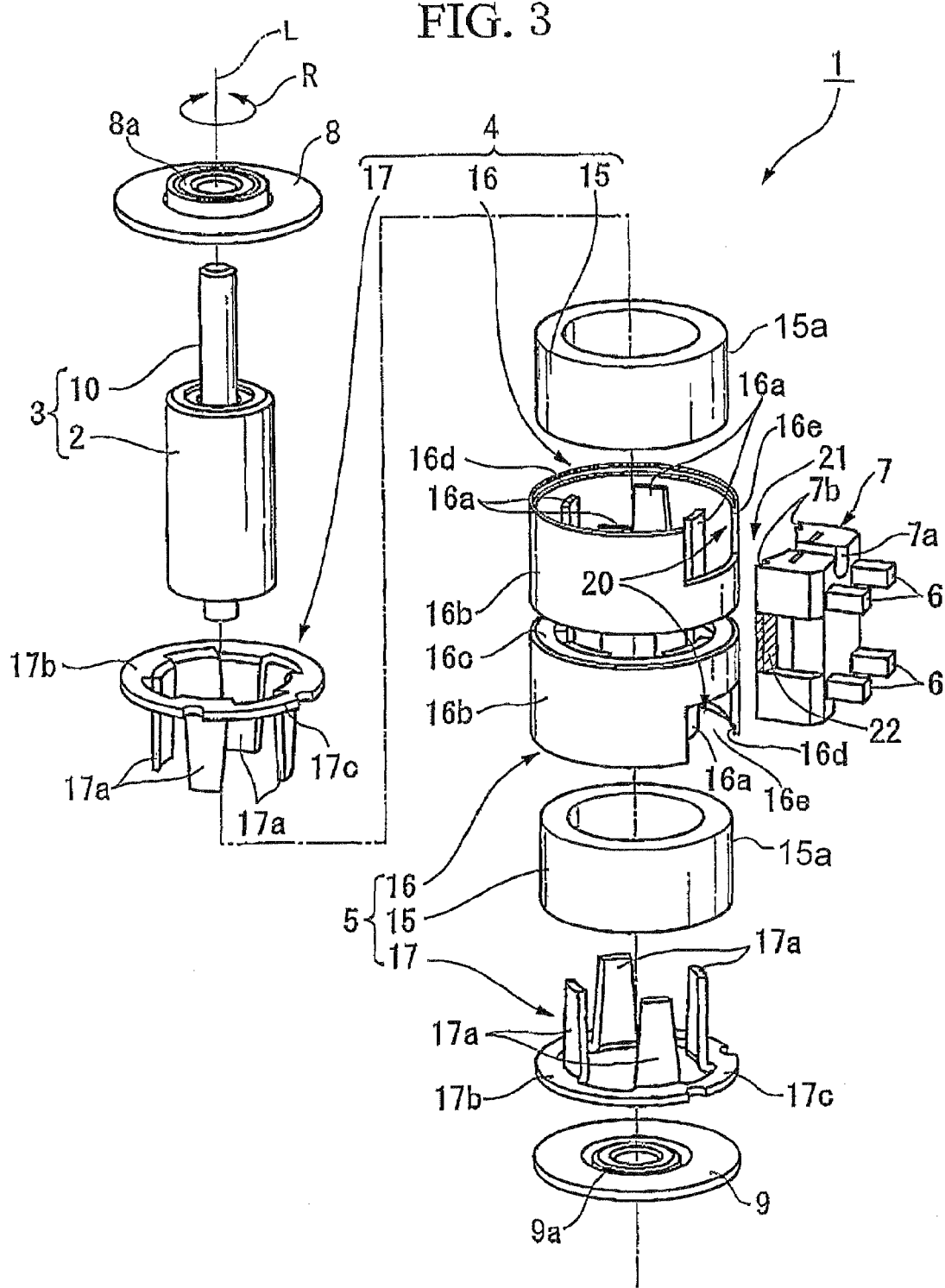
FIG. 3 is an exploded perspective view of the stepping motor shown in FIG. 2.

As shown in FIGS. 2 and 3, the stepping motor 1 is a crow-pole two-phase PM type stepping motor including a rotor 3 having a cylindrical permanent magnet 2 that is multipole magnetized in a circumferential direction R, a first yoke unit 4 and a second yoke unit 5 which are ring-shaped and arranged so as to be mutually stacked along an axis L of the rotor 3, a coil lead terminal (electrical connection member) 7 of resin material that includes metallic external connection terminals 6 and is secured to each of the first and second yoke units 4 and 5, and a pair of plates (lid members) 8 and 9 which enclose the first and second yoke units 4 and 5 from both sides along the axis L and also supports the rotor 3 such that it can rotate around the axis L.

The permanent magnet 2 is cylindrical such that it surrounds the periphery of a shaft 10 extending along the axis L, and is secured to the shaft 10 in one piece therewith. The magnetic pole of the permanent magnet 2 is divided into, for example, eight parts in the circumferential direction R, and magnetized such that these parts have alternately different polarities. In other words, the permanent magnet 2 and the shaft 10 together constitute the rotor 3.

The shaft 10 and the permanent magnet 2 are secured by an adhesive agent or the like inserted between them.

The first yoke unit 4 and the second yoke unit 5 have identical configurations. Accordingly, hereinafter, the first yoke unit 4 will be described in detail.

The first yoke unit 4 forms an A-phase stator, and includes a ring-shaped air-core coil 15 whose surface 15a is insulated, an outer yoke 16 having a plurality of magnetic pole teeth (crow poles; inductors) 16a arranged at fixed intervals in the circumferential direction R, and an inner yoke 17 having a plurality of magnetic pole teeth 17a arranged at fixed intervals in the circumferential direction R, the inner yoke 17 being connected to the outer yoke 16 by arranging the magnetic pole teeth 17a such that they alternate with the magnetic pole teeth 16a of the outer yoke 16 at equal intervals in the circumferential direction R in a noncontacting state.

The air-core coil 15 is molded by winding a coil winding into a ring of a predetermined size (outer diameter, inner diameter, thickness, height, etc.). The surface of the air-core coil 15 is insulated by means of an insulating layer and an adhesive layer, disposed on the outer skin of the coil winding.

The outer yoke 16 is, for example, formed as a cup-shaped metallic body made from a magnetic material such as pure iron. Specifically, the outer yoke 16 includes an outer cylindrical section 16b formed in a cylindrical shape around the axis L, a back face section 16c that bends at an angle of 90 degrees over a predetermined distance toward the axis L from the outer edge of one side of the outer cylindrical section 16b, and the magnetic pole teeth 16a that bend at an angle of 90 degrees over a predetermined distance from the back face section 16c substantially parallel with the axis L.

Incidentally, this embodiment describes an example where four magnetic pole teeth 16a are formed at fixed intervals in the circumferential direction R.

The outer cylindrical section 16b is slightly larger than the height and outer diameter of the air-core coil 15, and has a step 16d for positioning the inner yoke 17 along the axis L in the outer edges of its other end sides. A notch 16e for positioning the inner yoke 17 in the circumferential direction R, and for positioning the coil lead terminal 7 in two directions, i.e., the axis L direction and the circumferential direction R, is provided in one portion of the outer cylindrical section 16b. This positioning is described in detail later.

The back face section 16c bends toward the axis L from the outer edge of one end side of the outer cylindrical section 16b in accordance with the thickness of the air-core coil 15. That is, it bends so as to provide an interval that allows the air-core coil 15 to be accommodated between the outer cylindrical section 16b and the magnetic pole teeth 16a.

The magnetic pole teeth 16a are provided on the inner side of the outer cylindrical section 16b, and their lengths are adjusted such that their tips are near the step 16d. Also, their widths decrease gradually towards their tips, i.e., they are trapezoidal in shape. As described above, when the air-core coil 15 is accommodated between the magnetic pole teeth 16a and the outer cylindrical section 16b, the magnetic pole teeth 16a face the inner peripheral face of the air-core coil 15.

Similar to the outer yoke 16, the inner yoke 17 is formed from a metallic material made from a magnetic body such as, for example, pure iron, and includes a ring section 17b formed in the same ring-like shape as the back face section 16c, and the magnetic pole teeth 17a that bend at an angle of 90 degrees and over a predetermined distance from an inner periphery of the ring section 17b substantially parallel with the axis L. This embodiment describes an example where, similar to the magnetic pole teeth 16a of the outer yoke 16, four magnetic pole teeth 17a of the inner yoke 17 are formed at fixed intervals in the circumferential direction R.

When the inner yoke 17 is combined with the outer yoke 16, the ring section 17b contacts the step 16d of the outer yoke 16 and positions the inner yoke 17 along the axis L.

A protruding section 17c that fits into the notch 16e of the outer yoke 16 is provided in one portion of the outer peripheral side of the ring section 17b. This enables the inner yoke 17 and the outer yoke 16 to be combined in a state of being positioned with respect to circumferential direction R.

That is, the step 16d, the notch 16e, and the protruding section 17c constitute a yoke positioning means 20 for positioning the outer yoke 16 and the inner yoke 17 when they are combined.

The lengths of the magnetic pole teeth 17a of the inner yoke 17 are adjusted such that their tips are near the back face section 16c of the outer yoke 16. Similar to the magnetic pole teeth 16a of the outer yoke 16, their widths decrease gradually towards their tips, i.e., they are trapezoidal in shape. The magnetic pole teeth 17a are arranged facing the inner peripheral face of the air-core coil 15.

The positions of the magnetic pole teeth 17a of the inner yoke 17 are adjusted such that they intrude between the magnetic pole teeth 16a of the outer yoke 16 when the protruding section 17c is fitted into the notch 16e, i.e., such that their pitches deviate. Consequently, when the outer yoke 16 and the inner yoke 17 are combined, the magnetic pole teeth 16a and 17a are alternately arranged at equal intervals in a noncontacting state in the circumferential direction R.

The first yoke unit 4 forming the A-phase stator and the second yoke unit 5 forming the B-phase stator of the above configuration are arranged so as to be stacked while the back face sections 16c of the outer yokes 16 are in a surface contacting state, and are joined together by welding. The magnetic pole teeth 16a of the outer yoke 16 of the first yoke unit 4 and the magnetic pole teeth 17a of the inner yoke 17 of the second yoke unit 5 are joined such that their magnetic pole teeth pitches deviate by one-quarter pitch. In this state, the notches 16e of both outer yokes 16 match in the axis L direction.

The pair of plates 8 and 9 are disk-shaped, and are the same size as the outer diameter of the outer yokes 16. The plates 8 and 9 sandwich the stacked first and second yoke units 4 and 5 from both sides, and are joined to them by welding. The pair of plates 8 and 9 respectively include bearing sections 8a and 9a that allow the shaft 10 to be inserted through them and support it such that it can rotate around the axis L.

Figure 4:
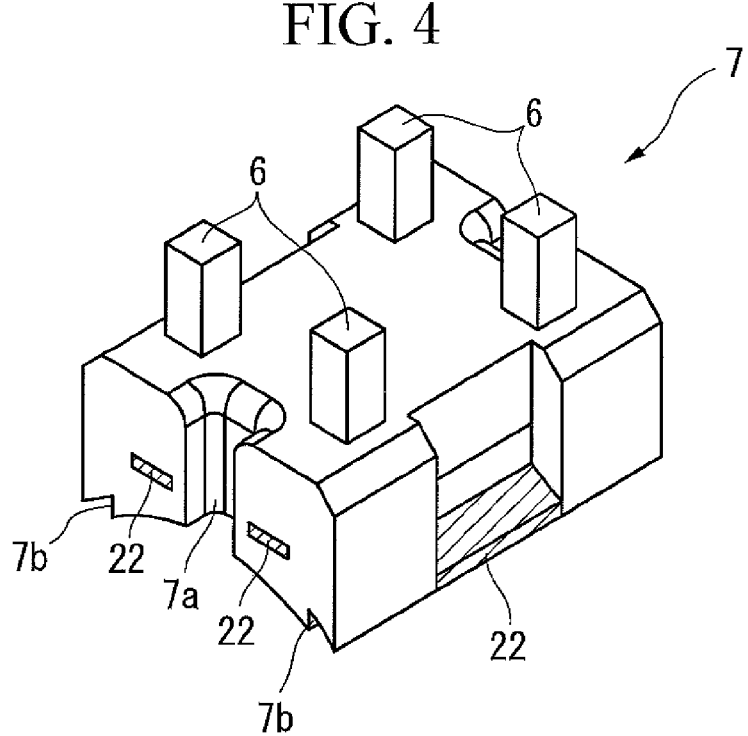
FIG. 4 is a perspective view of a coil lead terminal of the stepping motor shown in FIG. 2.
Figure 5:
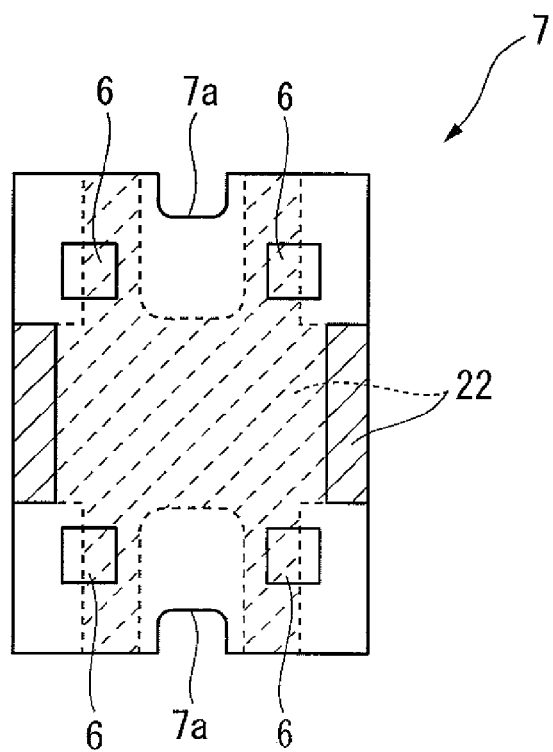
FIG. 5 is a top view of the coil lead shown in FIG. 4.
Figure 6:
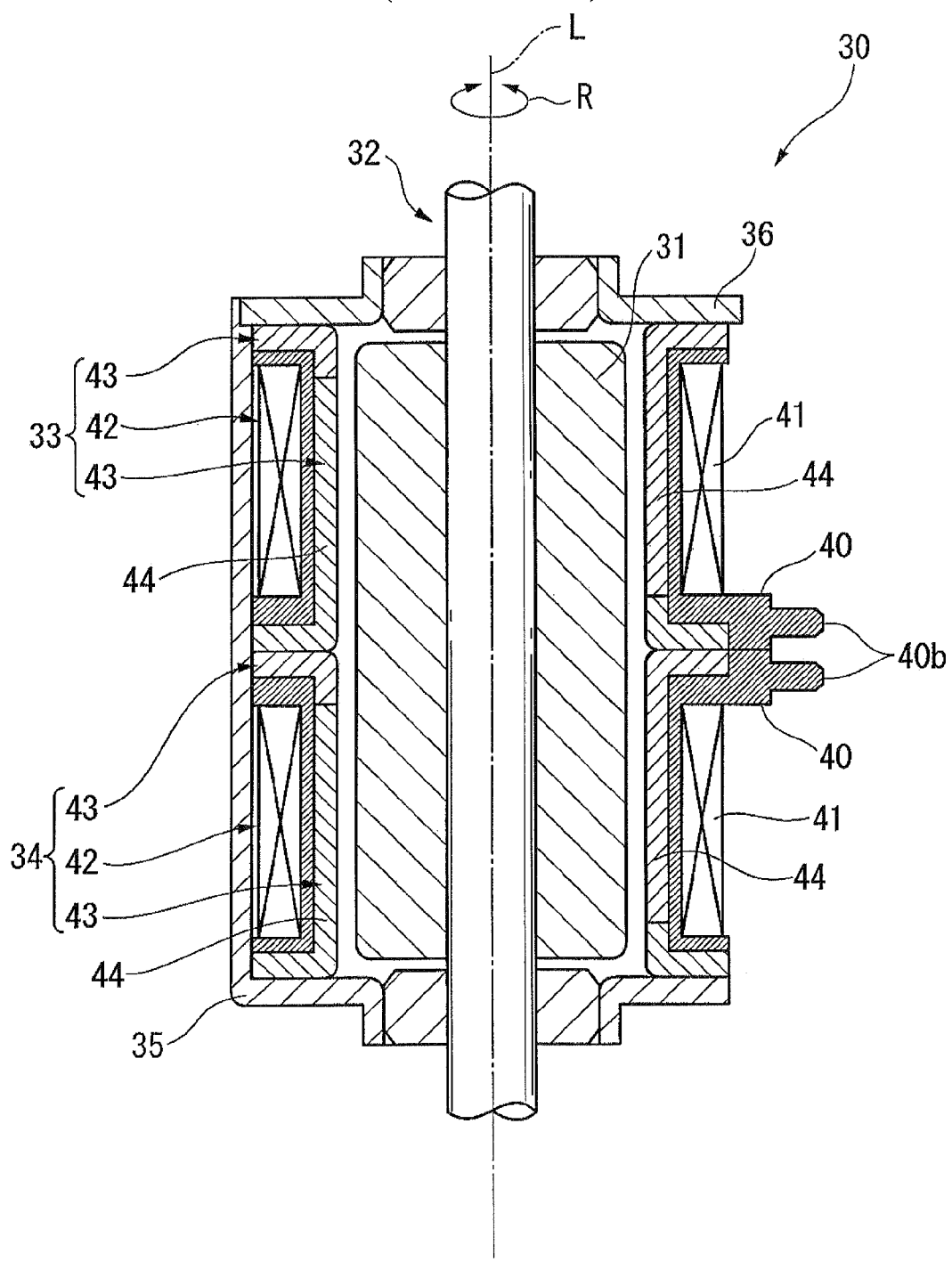
FIG. 6 is a cross-sectional view of one example of a stepping motor including a conventional housing.
Figure 7:
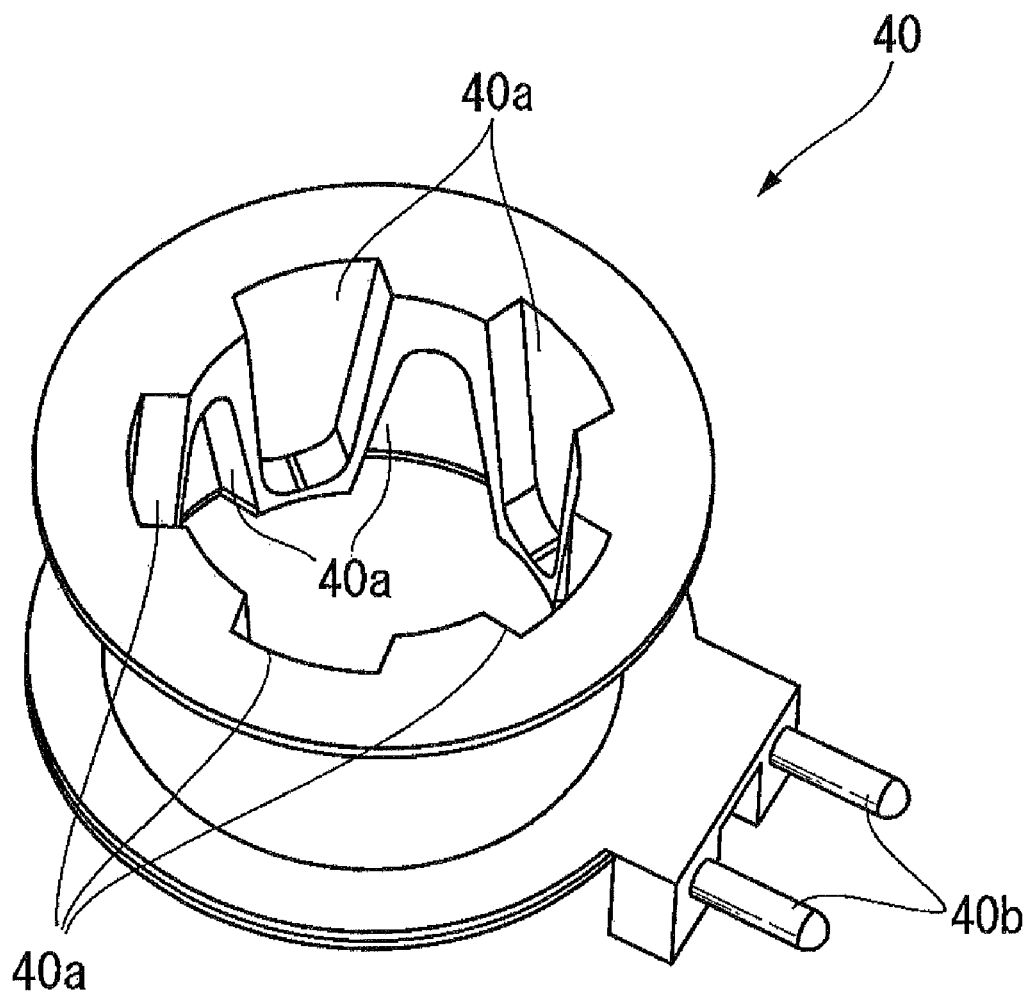
FIG. 7 is a perspective view of a bobbin that forms an exciting coil of the stepping motor shown in FIG. 6.

As shown in FIGS. 4 and 5, the coil lead terminal 7 is an approximately rectangular block of resin material. Four protruding external connection terminals 6, around which the winding ends (not shown) of the air-core coil 15 are wound so as to be electrically connected thereto, are provided on a surface of the coil lead terminal 7.

Two of these four external connection terminals 6 are for the air-core coil 15 of the first yoke unit 4, and the other two are for the air-core coil 15 of the second yoke unit 5. Furthermore, U-shaped groove sections 7a are provided on two sides of the coil lead terminal 7, and lead the winding ends of the air-core coil 15 from the top face to the reverse face.

Claw sections 7b are provided on the reverse faces of both sides of the coil lead terminal 7, and fit into the notches 16e in the first and second yoke units 4 and 5. By fitting these claw sections 7b into the notches 16e, the coil lead terminal 7 can be positioned with respect to the first and second yoke units 4 and 5 in two directions (the axial line L direction and the circumferential direction R). That is, the second substrate face 7B and the notches 16e constitute a terminal positioning means (connection member positioning means) 21 for positioning the coil lead terminal 7 with respect to the first and second yoke units 4 and 5.

The coil lead terminal 7 also includes nonmagnetic metal plates (metal members) 22 of, for example, stainless steel or the like, which are provided in regions that contact the first and second yoke units 4 and 5, that is, regions that contact both outer yokes 16. Exposed portions of the nonmagnetic metal plates 22 contact both outer yokes 16 and are joined to them by welding.

As shown in FIG. 1, the stepping motor of this configuration is attached and secured to a motor support member 111 that is secured to a first support plate 110. A cover 112 is U-shaped in cross-section and connected to the first support plate 110 such that it covers the top face of the first support plate 110 while leaving an internal space. The first support plate 110 and the cover 112 constitute a casing 113 of the camera module 104.

The lens body 101 is arranged above the imaging element 103. The lens body 101 includes a cylindrical lens holder 115, and one or a plurality of lenses Le which are secured to an inner peripheral face of the lens holder 115. As described above, the installation position of the imaging element 103 is adjusted such that it is arranged on the optical axis L1 of the lenses Le. Moreover, a lighting hole 112a is provided in the cover 112 above the optical axis L1 of the lenses Le.

The controller includes a CPU, a memory, and such like, and controls operations of the imaging element 103 and of the entire camera module 104. The motor driver supplies current to the winding ends of the air-core coil 15 of the stepping motor 1. The signal processor processes signals output from the imaging element 103, and outputs them to the controller.

The lens body 101 is arranged above the imaging element 103. The lens body 101 includes a cylindrical lens holder 115, and one or a plurality of lenses R which are secured to an inner peripheral face of the lens holder 115. As described above, the installation position of the imaging element 103 is adjusted such that it is arranged on the optical axis L1 of the lenses R. Moreover, a lighting hole 112a is provided in the cover 112 above the optical axis L1 of the lenses R.

A pair of convexities 116 and 117 are provided on the outer periphery of the lens holder 115 such that they face each other with the optical axis L1 between them. Guide holes 116a and 117a, such as through-holes and grooves which a pair of guide axes 118 and 119 can be inserted through, are formed respectively in the pair of convexities 116 and 117.

The pair of guide axes 118 and 119 are, for example, round bars arranged parallel to the optical axis L1 such that the lens body 101 is sandwiched between them, both their ends being secured to the cover 112 and the first support plate 110 respectively. That is, the lens body 101 is supported by the pair of guide axes 118 and 119 while being contained in an internal space of the casing 113, and is arranged between the imaging element 103 and the lighting hole 112a. In addition, the lens body 101 can slide freely between the pair of guide axes 118 and 119 and the pair of guide holes 116a and 117a. This enables it to move in the optical axis L1 direction along the pair of guide axes 118 and 119.

Of the convexities 116 and 117, the convexity 116 extends in a direction leading away from the lens body 101, and its tip has a nut section 116b that screws into a screw section 120a of a lead screw axis 120.

Similarly, the lead screw axis 120 is arranged parallel to the optical axis L1 at a position adjacent to one of pair of guide axes 118 and 119, namely the guide axis 118. Both ends of the lead screw axis 120 are secured to the cover 112 and the first support plate 110 such that it can rotate. This enables the lead screw axis 120 to rotate around an axis L2 that is parallel to the optical axis L1.

A driven gear 120b is molded together with the lead screw axis 120, and is formed on the first support plate 110 side thereof. A portion on the cover 112 side of the tip of the driven gear 120b forms the screw section 120a where a screw groove is formed in the outer peripheral face. As described above, the nut section 116b of the convexities 116 and 117 is screwed into the screw section 120a. Since the lens body 101 is now supported by the pair of guide axes 118 and 119, when the lead screw axis 120 is rotated around the axis L2, the nut section 116b moves in the axis L2 direction without following the rotation of the lead screw axis 120. In other words, its rotational motion is converted to linear motion.

The driven gear 120b of the lead screw axis 120 is connected to the shaft 10 of the stepping motor 1 via a transmission mechanism 121, and rotates around the axis L2 in conjunction with the rotation of the shaft 10.

Specifically, a drive gear 122 is secured to one end side of the shaft 10 of the stepping motor 1 and is engaged with an input gear 123a of an intermediate gear 123. The other end side of the shaft 10 of the stepping motor 1 is rotatably supported by a bearing (not shown) that is secured to the cover 112.

The intermediate gear 123 is sequentially is engaged with three additional intermediate gears 124, 125, and 126. An output gear 126a of the intermediate gear 126 arranged adjacent to the lead screw axis 120 is engaged with the driven gear 120b. Therefore, the rotational force of the shaft 10 is decelerated in three stages by the intermediate gears 123, 124, 125, and 126, and is thereafter transmitted to the lead screw axis 120.

The intermediate gears 123, 124, 125 and 126 rotate around respective axis members 130. Both ends of each axis member 130 are rotatably supported by the first support plate 110 and a second support plate 131 arranged opposite the first support plate 110. That is, the intermediate gears 123, 124, 125, and 126, the drive gear 122, and the axis members 130 constitute the transmission mechanism 121.

The nut section 116b, the lead screw axis 120, and the transmission mechanism 121 constitute a lens driving means 102 that moves the lens body 101 in conjunction with the rotation of the rotor 3, i.e., the shaft 10.

Subsequently, a method of assembling the stepping motor 1 of this embodiment will be explained while referring to FIGS. 2 and 3. The following explanation of an assembly method is merely one example, and the invention is not limited to this assembly sequence.

Firstly, the outer yokes 16 of the first and second yoke units 4 and 5 are stacked while the back face sections 16c thereof are in a surface contact state. At this time, a jig (not shown) is used to stack them precisely such that the magnetic pole teeth 16a of the outer yokes 16 deviate by a predetermined angle around the axis L. In this state, the notches 16e of the outer yokes 16 match the axis L direction (i.e., they are in a straight line). After this positioning, the outer yokes 16 are welded together.

The coil lead terminal 7 is then secured. That is, the claw sections 7b formed in the reverse face of the coil lead terminal 7 are fitted into the notches 16e of the outer yokes 16. This restricts the movement of the coil lead terminal 7 in two directions, i.e., the axis L direction and the circumferential direction R, and positions it with respect to the outer yokes 16. The exposed portions of the nonmagnetic metal plates 22 of the coil lead terminal 7 are now contacting the outer peripheral faces of the outer yokes 16, i.e., the outer cylindrical sections 16b. After this positioning ends, the exposed portions of the nonmagnetic metal plates 22 of the coil lead terminal 7 are joined to the outer yokes 16 by welding.

The air-core coil 15 is then accommodated inside the outer yoke 16 of the first yoke unit 4. That is, the air-core coil 15 is accommodated between the plurality of magnetic pole teeth 16a and the outer cylindrical section 16b of the outer yoke 16. The magnetic pole teeth 16a are thereby arranged facing the inner peripheral face of the air-core coil 15. After accommodating the air-core coil 15, the inner yoke 17 is added so as to cover the outer yoke 16. The protruding section 17c of the inner yoke 17 now meshes with the notch 16e of the outer yoke 16, and the ring section 17b of the inner yoke 17 contacts the step 16d of the outer yoke 16. The inner yoke 17 and the outer yoke 16 can thereby be combined in a state where they are reliably positioning with respect to two directions, i.e., the axis L direction and the circumferential direction R.

Thus the magnetic pole teeth 17a of the inner yoke 17 and the magnetic pole teeth 16a of the outer yoke 16 are arranged alternately at equal intervals in the circumferential direction R in a mutually noncontacting state. Similar to the magnetic pole teeth 16a of the outer yoke 16, the magnetic pole teeth 17a of the inner yoke 17 are arranged facing the inner peripheral face of the air-core coil 15.

Incidentally, when combining the inner yoke 17 and the outer yoke 16, the inner yoke 17 enters inside the outer yoke 16 and does not protrude excessively in the axis L direction.

Furthermore, when the air-core coil 15 is accommodated inside the outer yoke 16, the winding ends of the air-core coil 15 pass through the groove sections 7a of the coil lead terminal 7 and lead to the top face side where the external connection terminals 6 are provided.

After temporarily securing the inner yoke 17 and the outer yoke 16 so that the inner yoke 17 does not come free, the second yoke unit 5 is assembled in the same way as the assembly method of the first yoke unit 4 described above. The outer yoke 16 and the inner yoke 17 of the second yoke unit 5 are then temporarily secured.

The rotor 3 is inserted through the first and second yoke units 4 and 5. After inserting the rotor 3, the shaft 10 is inserted through the bearing sections 8a and 9a while attaching the pair of plates 8 and 9 so as to enclose the first and second yoke units 4 and 5 from both sides. As shown in FIG. 1, a jig or the like is used for adjustment such that a predetermined distance H is formed between the permanent magnet 2 and the magnetic pole teeth 16a and 17a of the first and second yoke units 4 and 5.

The pair of plates 8 and 9 are joined to the outer yokes 16 by welding. Lastly, the winding ends of the air-core coils 15 are wound around the four external connection terminals 6 of the coil lead terminal 7 and electrically connected thereto. Thus the stepping motor 1 can be assembled.

Subsequently, an example of operating the stepping motor 1 configured as described above, and moving the camera module 104 of the camera-fitted mobile telephone 100 to take a zoom image of an object (not shown) will be explained.

When the user performs a zoom operation while confirming the object on a display panel (not shown) of the camera-fitted mobile telephone 100, the controller mounted on the circuit substrate 114 of the camera module 104 supplies a current to the air-core coils 15 in order to operate the stepping motor 1. When the current flows to the air-core coils 15, the magnetic pole teeth 16a and 17a of the first and second yoke units 4 and 5 are sequentially excited to N-poles and S-poles. As a result, the rotor 3 can be rotated around the axis L.

As the rotor 3 rotates, the shaft 10 also rotates around the axis L, and so does the drive gear 122 secured to one end side of the shaft 10. The rotation of the drive gear 122 makes the engaged intermediate gears 123, 124, 125, and 126 rotate one after another around their axis members 130, and, after decelerating to a predetermined rotation rate, they rotate the driven gear 120b of the lead screw axis 120. Consequently, the screw section 120a rotates at a predetermined rotation rate around the axis L2.

The nut section 116b of one convexity 116 interlocking with the screw section 120a moves along the axis L2 direction in conjunction with the rotation of the lead screw axis 120. Consequently, the entire lens body 101 secured to the convexity 116 moves along the guide axes 118 and 119 in the axis L2 direction, i.e., the optical axis L1 direction. As a result, the lenses Le secured by the lens holder 115 can be moved near the imaging element 103, achieving a zoom. This enables user to take a zoom image of the object.

While this example describes a zoom, focusing can be performed freely by changing the rotational direction of the rotor 3 and moving the lens body 101 toward/away from the imaging element 103.

In particular, the stepping motor 1 of this embodiment differs from one using a conventional excitation coil wherein a coil winding is wound around the outer periphery of a bobbin in that the air-core coil 15 formed in a ring shape beforehand is used as an excitation coil, enabling the space conventionally occupied by a bobbin to be allocated for the air-core coil 15. This enables the coil volume to be increased without changing the overall size. As a result, the magnetomotive force of the coil can be greatly increased and the torque characteristic can be improved.

Since the winding terminals of the air-core coil 15 are connected to the external connection terminals 6 of the coil lead terminal 7 that are respectively secured to the first and second yoke units 4 and 5, they can be electrically connected to external components such as circuit components reliably and easily without a bobbin. Therefore, the air-core coil 15 can be used in the same manner as a conventional coil without requiring special connection means.

Instead of using a housing, the stepping motor 1 is assembled by combining the outer yokes 16, the inner yokes 17, and the air-core coils 15, making it easy to assemble. That is, instead of assembling the first yoke unit 4 (A-phase stator) and the second yoke unit 5 (B-phase stator) separately and then incorporating them in a housing, the constituent components can be assembled sequentially by a series of processes. This makes assembly easier and more precise. Since no housing is required, it can also be made smaller.

Since the outer yokes 16 of the first and second yoke units 4 and 5 are reliably joined to the pair of plates 8 and 9 by welding, and the coil lead terminal 7 includes the nonmagnetic metal plates 22, the coil lead terminal 7 can be reliably joined to the first and second yoke units 4 and 5 by welding. This strengthens the entire structure when assembled, and increases the reliability of the quality.

At the time of assembly, the yoke positioning means 20 enables the inner yokes 17 and the outer yokes 16 to be combined with their respective magnetic pole teeth 16*a* and 17*a* reliably arranged, alternately and at equal intervals, facing the circumferential direction R in a noncontacting state. This also makes assembly more precise. Therefore, unwanted magnetic leakage can be reduced and the torque characteristic can be enhanced.

Similarly, since the terminal positioning means 21 enables the coil lead terminal 7 to be positioned with respect to the first and second yoke units 4 and 5, the winding terminals of the air-core coils 15 can be reliably connected to the external connection terminals 6. This increases the assembly precision and improves quality.

As described above, since the camera-fitted mobile telephone 100 of this embodiment includes the stepping motor 1 whose torque characteristic is enhanced without changing its size in comparison with a conventional stepping motor, operations such as zooming and focusing can be performed easily and smoothly while increasing performance and reliability, without changing the size of the mobile telephone itself.

The above embodiment is exemplary of the invention and is not to be considered as limitative. Additions, omissions, substitutions, and other modifications can be made without departing from the spirit or scope of the present invention.

For example, while the above embodiment describes an example of a camera-fitted mobile telephone as the electronic apparatus, this is not limitative of the invention. For example, it can be a digital camera and the like.

Also, while in the above embodiment, the air-core coils are simply accommodated in the outer yokes, and the inner yokes function as lids for the outer yokes, a liquid insulating substance such as varnish can be impregnated from the notches in the outer yokes.

This enables the outer yokes, the air-core coils, and the inner yokes to be secured together by the insulating substance, whereby the first and second yoke units can be assembled more sturdily. This increases the strength and improves the quality.

While in the above embodiment, the first and second yoke units are joined by welding using the coil lead terminal that includes the metal plates, this is not limitative of the invention, and a resin coil lead terminal that includes no metal plates can be secured by adhesion instead. However, it is preferable to secure a coil lead terminal that includes metal plates by welding, as in the above embodiment, as this is more secure.

While the above embodiment uses a coil lead terminal as an electrical connection member having external connection terminals, when the stepping motor is incorporated in an electronic apparatus, a printed board that is normally used in electronic apparatuses can be used instead as the electrical connection member.

While in the above embodiment, the rotor has eight magnetic poles and each yoke unit has four magnetic teeth, this is not limitative of the invention, it being possible to change the number of magnetic poles of the rotor to four, six, ten, and the like, and to change the number of magnetic pole teeth of the yokes to two, three, five, and the like.

What is claimed is:

1. A stepping motor comprising:
a rotor including a cylindrical permanent magnet that is multipole magnetized in a circumferential direction;
ring-shaped first and second yoke units that are arranged so as to be mutually stacked along an axis of the rotor while surrounding a periphery of the rotor, and respectively include notches;
an electrical connection member of resin material that includes external connection terminals, is secured to the first and second yoke units, and includes claw sections, provided in a surface facing the first and second yoke units, that engage the notches of the first and second yoke units so as to position the electrical connection member with respect to the first and second yoke units; and
a pair of lid members that enclose the first and second yoke units from both sides thereof along the axis, and support the rotor so as to be rotatable around the axis,
each of the first and second yoke units including:
a ring-shaped air-core coil having an insulated surface; an outer yoke that accommodates therein the air-core coil and includes a plurality of magnetic pole teeth arranged at fixed intervals in a circumferential direction of the air-core coil; and an inner yoke that includes a plurality of magnetic pole teeth arranged at fixed intervals in a circumferential direction of the air-core coil, and is combined with the outer yoke such that the magnetic pole teeth are arranged alternately and at equal intervals in a noncontacting state with respect to the magnetic pole teeth of the outer yoke, wherein
winding ends of the air-core coil are electrically connected to the external connection terminals, and
the electrical connection member includes a nonmagnetic metal member which is electrically isolated from the air-core coil, and is provided in a region that contacts at least the first and second yoke units.

2. The stepping motor according to claim 1, wherein the outer yoke, the air-core coil, and the inner yoke are secured together by an insulating material.

3. The stepping motor according to claim 1, further comprising a yoke positioning means that positions the inner yoke and the outer yoke when they are combined.

4. An electronic apparatus comprising the stepping motor according to claim 1.

5. The electronic apparatus according to claim 4, comprising a camera module that includes:
a lens body arranged so as to be movable along an optical axis;
a lens driving means that moves the lens body along the optical axis in conjunction with the rotation of the rotor; and
an imaging element arranged on the optical axis.

6. The stepping motor according to claim 1, wherein the electrical connection member comprises U-shaped groove sections at two ends thereof, which lead the winding ends of the air-core coil to the external connection terminals.

* * * * *